United States Patent [19]

Lancet et al.

[11] 4,330,430
[45] May 18, 1982

[54] METHOD FOR PRODUCING AND REGENERATING A SYNTHETIC $CO_2$ ACCEPTOR

[75] Inventors: Michael S. Lancet; George P. Curran, both of Pittsburgh, Pa.; Everett Gorin, San Rafael, Calif.

[73] Assignee: Conoco Inc., Stamford, Conn.

[21] Appl. No.: 163,558

[22] Filed: Jun. 27, 1980

Related U.S. Application Data

[63] Continuation-in-part of Ser. No. 20,004, Mar. 12, 1979, abandoned.

[51] Int. Cl.³ .................. B01J 20/34; B01J 20/04; L01J 3/12
[52] U.S. Cl. ................... 252/420; 48/197 R; 252/443; 252/457; 423/230
[58] Field of Search ................ 252/411 R, 420, 443, 252/457, 475; 423/230, 232, 233, 637, 640; 48/197 R, 202

[56] References Cited

U.S. PATENT DOCUMENTS

| | | | |
|---|---|---|---|
| 2,456,072 | 12/1948 | Marisic | 48/197 R |
| 2,705,672 | 4/1955 | Gorin | 48/206 |
| 3,516,808 | 6/1970 | Curran et al. | 423/640 |
| 4,191,538 | 3/1980 | Gorin | 48/197 R |
| 4,231,760 | 11/1980 | Lancet et al. | 48/197 R |
| 4,284,528 | 8/1981 | Lancet et al. | 252/443 |

Primary Examiner—P. E. Konopka
Attorney, Agent, or Firm—William A. Mikesell, Jr.; F. Lindsey Scott; Dale Lovercheck

[57] ABSTRACT

A method for producing a synthetic $CO_2$ acceptor by feeding a mixture of finely divided silica and at least one finely divided calcium compound selected from the group consisting of calcium oxide and calcium carbonate to a fluidized bed; operating the fluidized bed at suitable conditions to produce pellets of synthetic $CO_2$ acceptor and recovering the pellets of synthetic $CO_2$ acceptor from the fluidized bed. Optionally, spent synthetic $CO_2$ acceptor can be charged to the fluidized bed to produce regenerated pellets of synthetic $CO_2$ acceptor.

8 Claims, 1 Drawing Figure

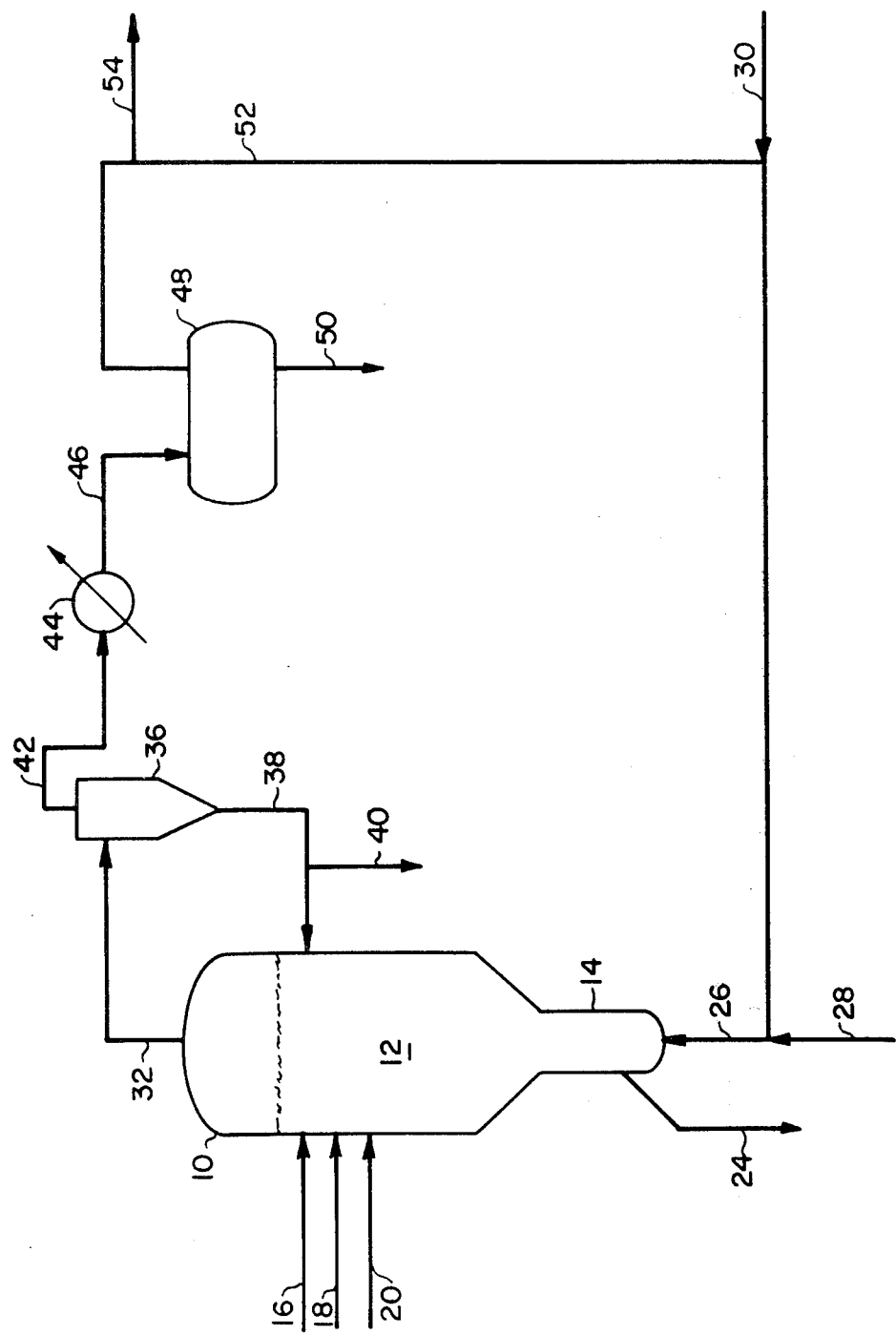

METHOD FOR PRODUCING AND REGENERATING A SYNTHETIC CO₂ ACCEPTOR

The Government has rights in this invention pursuant to Contract No. EX-76-C-01-1734 awarded by the U.S. Department of Energy.

This application is a continuation-in-part of our earlier filed application, Ser. No. 020,004 of the same title filed Mar. 12, 1979, now abandoned.

This invention relates to methods for producing synthetic $CO_2$ acceptors.

This invention further relates to the production and regeneration of synthetic $CO_2$ acceptors used in processes wherein carbonaceous fuels are reacted with steam in the presence of a $CO_2$ acceptor which removes $CO_2$ from the reaction zone.

In view of the continuing and well-known shortage of natural gas fuels and the like, a continuing effort has been directed to the production of similar fuels from naturally-occurring carbonaceous fuels which are in more abundant supply such as, for instance, coal. One process which has been developed for the production of synthetic natural gas from coal comprises the reaction of steam with carbonaceous fuels such as coal of varying grades in the presence of a $CO_2$ acceptor such as calcium oxide to thereby produce a synthesis gas which is relatively rich in hydrogen. Some such processes are shown in U.S. Patents:

U.S. Pat. No. 2,654,661—Gorin
U.S. Pat. No. 2,654,662—Gorin
U.S. Pat. No. 2,654,663—Gorin
U.S. Pat. No. 2,682,455—Gorin
U.S. Pat. No. 2,682,456—Gorin
U.S. Pat. No. 2,682,457—Gorin
U.S. Pat. No. 2,705,672—Gorin
U.S. Pat. No. 2,781,248—Gorin
U.S. Pat. No. 2,807,529—Tarbox
U.S. Pat. No. 3,108,857—Gorin et al.
U.S. Pat. No. 3,115,394—Gorin et al.
U.S. Pat. No. 3,188,179—Gorin
U.S. Pat. No. 3,194,644—Gorin et al.
U.S. Pat. No. 3,516,808—Curran et al.

These references are hereby incorporated in their entirety by reference.

In a prior art search conducted on the concept of the subject invention, the following references were discovered:

U.S. Pat. No. 1,574,380—Endres
U.S. Pat. No. 2,057,402—Tropsch
U.S. Pat. No. 2,234,367—Chesny
U.S. Pat. No. 3,141,729—Clarke
U.S. Pat. No. 3,847,837—Boryta
U.S. Pat. No. 3,865,924—Gidaspow In the prosecution of U.S. Ser. No. 020,004, the following reference was cited in addition to a portion of the references listed above:

U.S. Pat. No. 2,456,072—Marisic.

In the practice of such processes, the use of naturally-occurring $CO_2$ acceptor material such as limestone and the like has been found to suffer from a decreased activity of the $CO_2$ acceptor upon repeated recycling. While a variety of factors may contribute to this decreasing activity, at least one major factor is a growth in the crystal size of the calcium oxide produced upon regeneration of the calcium carbonate. To overcome this shortcoming, synthetic $CO_2$ acceptors have been developed. Such synthetic $CO_2$ acceptors comprise calcium compounds such as calcium oxide and calcium carbonate supported in a thermally stable calcium-rich matrix such as that produced by the reaction of calcium oxide or calcium carbonate with silica. Such synthetic acceptors are readily regenerated and have an extended life because the reaction zone can be operated under conditions such that the active calcium compounds are melted with each cycle, thereby regenerating the crystal structure upon each recycling. Such synthetic acceptors have an extended life but still suffer from a limited life because of the combination of ash with the active calcium compounds to the extent that relatively inert ash-rich shells are formed on the exterior of the synthetic acceptor particles. When such occurs, it is necessary to regenerate the synthetic $CO_2$ acceptor.

In the use of such acceptors, it is desirable that an economical and effective method for producing the synthetic $CO_2$ acceptor be available.

It has now been found that such synthetic $CO_2$ acceptors are readily produced by a process comprising feeding a mixture consisting of finely divided silica and a finely divided calcium compound selected from the group consisting of calcium oxide and calcium carbonate to a fluidized bed and operating the fluidized bed at suitable conditions to convert the silica and calcium compound into pellets of synthetic acceptor which are then recovered from the fluidized bed.

In a similar fashion, synthetic $CO_2$ acceptor may be regenerated by grinding the spent synthetic $CO_2$ acceptor and charging the finely ground spent acceptor to a fluidized bed which is operated at conditions suitable to pelletize the finely divided spent acceptor to produce regenerated pellets of synthetic acceptor which are then recovered from the fluidized bed as described more fully hereinafter.

The FIGURE is a schematic diagram of the process of the present invention.

In the FIGURE, a vessel 10 containing a fluidized bed 12 is shown. Fluidized bed 12 comprises a blend of silica and calcium compounds in a proper ratio to produce the desired synthetic $CO_2$ acceptor. Vessel 10 includes a standpipe 14 which is a reduced diameter section positioned on the lower portion of vessel 10. A line 16 is provided for introducing silica into vessel 10 and a line 18 is provided for introducing calcium compounds such as calcium oxide or calcium carbonate into vessel 10. A line 20 is also provided for introducing spent acceptor or the like into vessel 10. Pellets are recovered from vessel 10 via a line 24 with overhead gases being recovered through a line 32. Fluidizing gas is introduced into vessel 10 via a line 26. The fluidizing gas comprises steam, carbon dioxide and optionally inert gases. Steam is introduced through a line 28 and carbon dioxide is introduced through a line 30 as required. The overhead gases recovered through line 32 are passed to a gas/solids separator such as a cyclone 36 where the solids are separated and recovered through a line 38. As shown, the solids can be recycled to vessel 10 or discarded via a line 40 depending upon the nature of the solids or the like. For instance, if the solids correspond to the average composition in vessel 12, desirably they would be recycled, whereas if the solids comprise primarily lighter components such as ash, associated with synthetic acceptor or the like, these materials would normally be discarded. The cleaned gases are recovered via a line 42 and optionally recycled to vessel 10. As shown, a heat exchanger 44 is positioned in line 42 to cool the gases for passage through a line 46 to a condenser 48 from which an aqueous stream is removed via a line 50. The aqueous stream removed through line 50 will normally contain various contaminants which are removed from the gases flowing through line 46 by condensation. Various means known to those skilled in the art can be used to clean the gases flowing through line 46 in condenser 48 such as, for instance, by bubbling the gases through condensed liquid or the like. Such variations are well known to those skilled in the art and need not be discussed further. The gases recovered from condenser 48 are passed through a line 52 back to line 26 for recycle to vessel 10. Optionally, a purge gas stream may be withdrawn through a line 54. The operation of fluidized beds such as fluidized bed 12 is well known to those skilled in the art and need not be discussed in detail. The fluidizing gas is charged to vessel 10 in an amount sufficient to maintain a pressure in vessel 10 from about 15 to about 25 atmospheres at a temperature from about 1200° to about 1600° F. The $CO_2$ pressure is desirably greater than about 1 atmosphere with the steam partial pressure being above 13 atmospheres and preferably from about 14 to about 20 atmospheres. A low melting complex containing CaOH and $CaCO_3$ is desirably formed as discussed in U.S. Pat. No. 2,705,672 in an amount sufficient to react with the the $SiO_2$ to form the desired synthetic acceptor pellets, but not in an amount sufficient to cause agglomeration of the entire fluidized bed. The steam partial pressure and $CO_2$ partial pressure are controlled to values such that pellets of acceptor are formed for recovery through pipe 24. The pellets, when the desired size is reached, descend into standpipe 14 and are readily recovered through line 24. The lighter particles are maintained in a fluidized condition above standpipe 14.

While Applicants do not wish to be bound by any particular theory, it is believed that calcium carbonate-calcium hydroxide-calcium oxide eutectic mixtures form in the presence of steam, thereby resulting in plastic or liquid mixtures which function as a binder which facilitates the formation of the pellets. A substantial portion of the calcium compound charged to vessel 10 reacts with the silica to form various calcium/silica compounds which serve as the calcium-rich matrix which contains excess calcium compound. The calcium compound is charged to fluidized bed 12 in an amount up to about 35 weight percent, based on calcium carbonate equivalent, in excess of the amount of calcium compound required to react with the silica to produce the calcium-rich matrix. The limiting factor in the amount of calcium compound charged is the tendency for the calcium compound to form larger agglomerates or grape clusters of agglomerates when present in too large a quantity. While Applicants do not wish to be bound by any particular theory, it is believed that up to about 35 weight percent excess calcium compound is supported within the inert calcium-rich matrix in such a fashion that, even when it becomes liquid, during the formation of the low melting eutectic referred to above, the molten calcium compound is held within the matrix, thereby resulting in a discrete particle which permits repeated melting and hardening of the calcium compound during the use of the synthetic $CO_2$ acceptor. Desirably, the synthetic acceptor produced by the process of the present invention has a $CO_2$ absorption capacity of about 12 to about 20 grams of $CO_2$ per 100 grams of calcined synthetic $CO_2$ acceptor.

While considerable latitude is possible in the size of synthetic $CO_2$ acceptor pellets produced, it is desirable that the pellets produced be from about ⅛ to about ¼ inches in diameter. Such permits the ready recovery of the pellets from vessel 10 and is a suitable size for use in most processes wherein synthetic $CO_2$ acceptors are useful.

In a variation of the present invention, spent synthetic $CO_2$ acceptor is regenerated, utilizing the fluidized bed. Spent synthetic $CO_2$ acceptor is that which has been used in processes such as the reaction of steam with carbonaceous fuel, such as coal, through a number of cycles such that the activity of the synthetic $CO_2$ acceptor has been reduced below some minimum level. Such reduction in activity can occur due to a variety of circumstances, but one major cause is the combination of the acceptor with the ash resulting from the combustion of coal or other ash-containing materials in the presence of the synthetic $CO_2$ acceptor. The ash may become associated with the calcium compounds by adhering to the calcium compounds when they become liquid, thereby producing a relatively inert ash-containing shell about the exterior of the synthetic $CO_2$ acceptor particles. While, in some instances, such particles may be regenerated at least in part by attrition or the like, it is desirable that some method be available for regenerating this spent synthetic acceptor. Such a result is accomplished by grinding or otherwise finely dividing the spent synthetic $CO_2$ acceptor and charging it to vessel 10 through line 20. The spent synthetic $CO_2$ acceptor then forms pellets as is the case with the silica and calcium compounds charged to vessel 10 through lines 16 and 18. The silica values and the calcium compound values present in the spent synthetic $CO_2$ acceptor are recovered and regenerated synthetic $CO_2$ acceptor is produced via line 24. Such permits the addition of calcium compounds as required to fully regenerate the spent synthetic $CO_2$ acceptor. The ash and similar materials present in the spent synthetic $CO_2$ acceptor may form a portion of the matrix of the regenerated synthetic $CO_2$ acceptor, thus requiring the addition of minor quantities of calcium compounds. In other instances, the ash may be recovered via line 32 and discarded via line 40. In any event, the ash, if it is retained in the regenerated synthetic $CO_2$ acceptor, forms a portion of the inert matrix and is not considered to adversely affect the performance of the regenerated synthetic $CO_2$ acceptor. The regeneration is accomplished at similar reaction conditions to those used in the production of synthetic $CO_2$ acceptor initially, with the calcium compound being present in the fluidized bed in an amount sufficient to provide up to 35 weight percent excess calcium compound, based on calcium carbonate equivalent, beyond that required to react with the silica in fluidized bed 12 to produce the calcium-rich matrix. Desirably, the regenerated synthetic $CO_2$ acceptor also has a $CO_2$ absorption capacity of about 12 to 20 grams of $CO_2$ per 100 grams of calcined synthetic $CO_2$ acceptor. In some instances, it may also be desirable to charge silica to fluidized bed 12 when it is desired to continue to manufacture additional synthetic $CO_2$ acceptor in addition to regenerating the spent $CO_2$ acceptor charged to bed 12.

Optionally at least, a portion of the finely divided silica and the finely divided calcium compound may be mixed and at least partially calcined prior to charging the product mixture so produced to the fluidized bed. It may be necessary to grind the product mixture so produced to a suitable size prior to charging the produce mixture to the fluidized bed.

While suitable operating conditions in fluidized bed 12 are a total pressure from about 15 to about 25 atmospheres, a temperature from about 1200° to about 1600° F., a $CO_2$ pressure up to about 5 atmospheres, and a steam partial pressure from about 14 to about 20 atmospheres, it has been found that particularly preferred operating conditions are a total pressure from about 16 to about 23 atmospheres, a $CO_2$ partial pressure from about 2 to about 3 atmospheres, a steam partial pressure from about 16 to about 20 atmospheres, and a temperature from about 1400° to about 1600° F. Desirably, the calcium compound is fed to fluidized bed 12 in an amount equal to from about 20 to about 35 weight percent, based on the calcium carbonate equivalent, in excess of the amount of the calcium carbonate compound required to react with the silica to produce the calcium-rich matrix.

Having thus described the invention by reference to certain of its preferred embodiments, it is pointed out that the embodiments set forth are illustrative rather than limiting in nature and that many variations and modifications are possible within the scope of the present invention. Many such variations and modifications may appear obvious and desirable to those skilled in the art based upon the foregoing description of preferred embodiments.

Having thus described the invention, we claim:

1. A method for producing regenerable synthetic discrete $CO_2$ acceptor pellets for use as fluidized bed $CO_2$ acceptor material, said acceptor comprising a thermally stable inert support matrix and at least one calcium compound selected from the group consisting of calcium oxide and calcium carbonate, said thermally stable inert support matrix providing support for said calcium compound such that when said calcium compound is molten, said molten calcium compound is held within said thermally stable inert support matrix thereby permitting repeated melting and hardening of said calcium compound without agglomeration of said fluidized bed of said regenerable synthetic discrete $CO_2$ acceptor pellets said method comprising
   (a) feeding to a fluidized bed finely divided silica and a finely divided calcium compound selected from the group consisting of calcium oxide and calcium carbonate in an amount from about 20 to about 35 weight percent, based on calcium carbonate equivalent, in excess of the amount of calcium compound required to react with said silica to produce said regenerable synthetic discrete $CO_2$ acceptor pellets;
   (b) operating said fluidized bed at a total pressure from about 15 to about 25 atmospheres, a temperature from about 1200° to about 1600° F., a $CO_2$ partial pressure from about 1 to about 5 atmospheres and a steam partial pressure from about 14 to about 20 atmospheres to form said regenerable synthetic discrete $CO_2$ acceptor pellets.

2. The method of claim 1 wherein said synthetic $CO_2$ acceptor has a $CO_2$ absorption capacity of about 12 to about 20 grams of $CO_2$ per 100 grams of calcined synthetic $CO_2$ acceptor.

3. The method of claim 1 wherein spent synthetic $CO_2$ acceptor is charged to said fluidized bed in addition to said silica and said calcium compound.

4. The method of claim 1 further comprising contacting said $CO_2$ acceptor pellets with $CO_2$ to form spent $CO_2$ acceptor pellets;
   regenerating said spent $CO_2$ acceptor pellets in a fluidized bed at a total pressure from about 15 to about 25 atmospheres, a temperature from about 1200° to about 1600° F., a $CO_2$ partial pressure from about 1 to about 5 atmospheres and a steam partial pressure from about 14 to about 20 atmospheres to form regenerated $CO_2$ acceptor pellets.

5. The method of claim 4 wherein said regenerated synthetic $CO_2$ acceptor has a $CO_2$ absorption capcity of about 12 to about 20 grams of $CO_2$ per 100 grams of calcined synthetic $CO_2$ acceptor.

6. The method of claim 5 wherein silica is charged to said fluidized bed.

7. The method of claim 5 wherein said total pressure is from about 16 to about 20 atmospheres.

8. The method of claim 5 wherein said regenerated synthetic $CO_2$ acceptor contains ash components produced in processes utilizing said $CO_2$ acceptor.

* * * * *